United States Patent [19]
Waldman et al.

[11] 3,877,989
[45] Apr. 15, 1975

[54] POWER SYSTEM AND AN ELECTROCHEMICAL CONTROL DEVICE THEREFOR

[75] Inventors: Elliot Isadore Waldman, West Hartford; John Richard Aylward, Vernon, both of Conn.

[73] Assignee: United Aircraft Corporation, East Hartford, Conn.

[22] Filed: Sept. 13, 1971

[21] Appl. No.: 179,962

[52] U.S. Cl.............. 136/86 B; 60/531; 136/86 A; 136/86 C; 204/195; 204/DIG. 6
[51] Int. Cl................... H01m 27/12; H01m 27/14
[58] Field of Search......... 136/86 B, 86 A; 204/129, 204/DIG. 6, 270, 278, 86 B; 60/531

[56] References Cited
UNITED STATES PATENTS

| | | | |
|---|---|---|---|
| 1,916,235 | 7/1933 | Reuben | 204/DIG. 6 |
| 2,925,455 | 2/1960 | Erdensohn et al. | 136/86 A |
| 2,984,607 | 5/1961 | White et al. | 204/129 |
| 3,159,506 | 12/1964 | Salathe | 136/86 B |
| 3,432,356 | 3/1969 | Christianson | 136/86 B |
| 3,585,078 | 6/1971 | Sederquist et al. | 136/86 B |
| 3,616,335 | 10/1971 | Carson | 204/129 |

FOREIGN PATENTS OR APPLICATIONS 1,148,935   4/1969   United Kingdom.................. 136/86

*Primary Examiner*—Allen B. Curtis
*Attorney, Agent, or Firm*—Alfred W. Breiner

[57] ABSTRACT

A transducer is provided which comprises a metal/gas-/electrolyte electrochemical cell which delivers a high-gain change of gas pressure as a function of millivolt shunt voltage impressed upon its electrodes. The device is simple, relatively inexpensive and reliable with a high degree of sensitivity enabling its use, for example, in a fuel cell power plant to sense and use load current to directly control the power plant.

3 Claims, 4 Drawing Figures

INVENTORS,
ELLIOT I. WALDMAN
JOHN R. AYLWARD

POWER SYSTEM AND AN ELECTROCHEMICAL CONTROL DEVICE THEREFOR

FIELD OF THE INVENTION AND BACKGROUND

This invention is directed to control devices of the type useful for operation of power plants generating electrical energy which will sense and use load current to directly control operation of the power plant. More particularly, the invention is directed to an electrochemical transducer which delivers a high-gain change of gas pressure as a function of millivolt shunt voltage impressed upon the electrodes of the electrochemical cell. For convenience, the invention will be described hereinafter with reference to power plants comprising a plurality of fuel cells. As apparent, however, the control device of the invention has application in other areas where similar considerations apply, permitting its use in such areas.

A fuel cell, as the term is employed herein, designates an electrochemical cell for the direct generation of electrical energy from a fuel and oxidant. With such cells it is not necessary to go through the usual conversion of chemical energy to heat energy to mechanical energy to electrical energy as is common with heat engines. Such cells in their most simplified design comprise a housing, an oxidant electrode, a fuel electrode, and an electrolyte. In operation, it is necessary that the fuel and oxidant contact a surface of their respective electrodes where a process of adsorption and desorption occurs leaving the electrodes electrically charged with the second surface of the electrodes being in contact with the electrolyte. Depending upon the nature of the electrolyte, ions are transferred through the electrolyte from the anode to the cathode or from the cathode to the anode. Electrical current is withdrawn from the cell and passed through a suitable load where work is accomplished.

In practical application of such devices, it is essential to stack or tie a plurality of devices together to obtain the necessary current and voltage characteristics for a particular application. Moreover, it is essential to control the volume of current at a designated voltage dependent upon use demands. This requires control of reactants fed to the cell, control of coolants employed in heat-exchange relation with the cell, etc. The desirability of controlling fuel cell power plant operations by using load current as a control input is recognized in the prior art. However, heretofore the implementation of such control has required complex and relatively expensive electronic or electromechanical systems.

OBJECTS OF INVENTION AND GENERAL DESCRIPTION

Accordingly, a primary object of the present invention is to provide an electrochemical control device which will deliver a high-gain change of gas pressure as a function of millivolt shunt voltage impressed upon the electrodes of an electromechanical cell.

It is another object of this invention to provide an electrochemical control device or transducer which is simple in construction and operation, relatively inexpensive, and reliable with a high degree of sensitivity.

It is another primary object of this invention to provide a control device for a power plant generating electrical energy which is simple, relatively inexpensive and reliable with a high degree of sensitivity.

It is another object of this invention to provide an electrochemical control device for sensing and using load current of an electrical energy producing power plant to directly control the performance of the power plant.

It is another object of this invention to provide an electrochemical pressure generator which provides a simple means of sensing and using load current of a power plant to control operation of the power plant.

The aforesaid and other objects of this invention will be readily apparent from the following detailed description, with particular emphasis being placed upon the drawing and illustrative embodiments.

The control device of the present invention is a pressure generator comprising a metal/gas/electrolyte electrochemical cell which delivers a high-gain change of gas pressure as a function of millivolt shunt voltage imposed upon its electrodes. More specifically, a metal/gas/electrolyte electrochemical cell is constructed utilizing a lightweight, non-consumable anode, a cathode, and an ion-conductive electrolyte between the anode and cathode. A gas cavity is retained above the electrolyte. The set point is attained on the pressure generator by pressurizing the gas cavity to a desired level. A corresponding open circuit potential across the cell electrodes exists for each gas pressure for a given system. When a millivolt potential above that of the set point is imposed across the cell, the gas pressure is reduced to a new equilibrium value. This pressure decrease is caused by ionization of some gas molecules in the gas cavity and the electrolyte/gas interface and their combining with ions from the cathode. When a potential below an equilibrium is imposed across the cell, the opposite reaction occurs and more gas molecules are formed, thereby raising the pressure in the gas cavity. The foregoing reaction which is a description of an ion-exchange mechanism can be expressed as follows for a lead/hydrogen/acid electrolyte system:

$$Pb + 2 H^+ \rightleftharpoons H_2 + Pb^{+2}$$

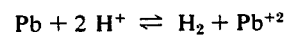

(1)

The change in pressure in the control device will set in motion ancillary equipment to, for example, control the feed of reactants to a fuel cell stack and/or control the coolant flow which is in heat-exchange relation with the fuel cell stack. As will be more fully apparent hereinafter, the control device or transducer of the present invention which has a minimum number of moving parts will replace control devices presently performing the same operation which require a combination of electronic elements, solenoid valve, outside pressure sources, and the like.

The electrochemical cell which is to be utilized in accordance with the present invention must be sensitive to current or potential change across its electrodes to initiate the gas evolution or gas consumption reaction noted above. The anode of the cell will be mated or coupled to the gas being evolved or consumed and, preferably, are catalyzed carbon discs or the lightweight screen type electrodes comprising a conductive screen embedded in a uniform admixture of catalyst and a hydrophobic polymer such as polytetrafluoroethylene. Other electrodes, however, which will facilitate the electrochemical reaction with the gas being evolved or consumed can be utilized. Such electrodes include porous metal discs such as discs of palladium/- gold alloys, activated nickel discs, or the like. The essential feature is that the electrode is relatively compact and, further, is electrochemically reactive under the conditions of use of the control device. The cathode will preferably comprise a metal selected to have a low over-voltage, i.e., to minimize internal cell resistance and result in high response time. A preferred system is lead/hydrogen/acid electrolyte. This system has a low over-voltage and high response time permitting extremely sensitive control. Other operable systems include silver/hydrogen/acid electrolyte, copper/hydrogen/acid electrolyte, silver/oxygen/acid electrolyte, silver/oxygen/alkaline electrolyte, and the like. The cathode can be in various forms, but is preferably a porous sheet or plate of the metal. Alternatively, non-porous metal foils or sheets can be utilized.

The electrochemical cell which is employed herein can also be a concentration cell utilizing a non-consumable anode and cathode which are in separate gas pipe chambers. In this cell, the generator is controlled by the change in the partial pressure of the gas as a result of the shunt voltage. Design factors are more complex with this cell since it is necessary to have the electrodes in separate pressure chambers.

The electrolyte which is to be utilized in the electrochemical cell is to be selected for its compatibility with the anode and cathode and with the gas being evolved or consumed. Operable electrolytes include acids and alkalines such as sulphuric acid, phosphoric acid, nitric acid, perchloric acid, and the like.

Although the control device can comprise a single electrochemical cell, it can be desirable or preferable to utilize two cells in tandem connecting the anodes together electrically. This will maintain a zero voltage across the electrodes of the cells, preventing electrolysis due to potential difference and, consequently, loss of sensitivity, thereby causing the need of opening the electrical input circuit when no shunt voltage is present.

THE DRAWING AND SPECIFIC EMBODIMENT

In order to more specifically illustrate the invention, reference is made to the drawing wherein FIG. 1 is a cross-sectional, diagrammatic view of a control device according to the present invention employing a single cell;

Figure 1:
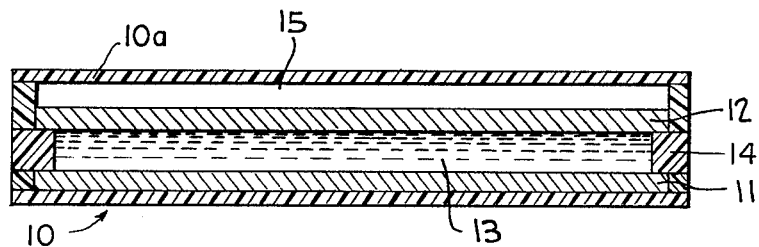

Referring to FIG. 1, the device 10 comprises a metal cathode 11, and anode 12, and an electrolyte 13 separating the anode and cathode. An insulating ring 14 is positioned between the anode and cathode retaining the electrolyte. A gas space 15 is adjacent to and in fluid contact with anode 12. In the device shown in the drawing, the anode consists of a porous carbon disc which has been pulse-plated with 0.10 grams of platinum catalyst and the cathode is a pure lead sheet. The components are sandwiched together in a plexiglass housing 10a with neoprene gaskets between each parting surface to afford a gas-tight seal. The gas cavity above the anode is approximately 20 cubic centimeters and is tied into a pressure gauge, not shown. The electrolyte is a 1 molar solution of 26 milliliters lead perchlorate and perchloric acid. In constructing the cell, the electrolyte cavity was evacuated and then backfilled to preclude any air contamination. The electrolyte level is such that the lower surface of the anode only contacts the electrolyte. The pH of the electrolyte is 0.4. The steady state performance of the cell can be estimated from the Nernst electrochemical equation as follows:

$$Pb + 2H^+ \rightleftharpoons H_2 + Pb^{+2} \quad (1)$$

$$0.03 \, Log_{10}P = -0.06 \, pH + 0.126 - E - 03 \, Log_{10}(Pb^{+2}) \quad (2)$$

where:
 $P = H_2$ pressure (atmospheres)
 $pH = log_{10}(1/H_2ion) = .40$ measured
 $E = $ Electrical potential across cell (volts)
 $(Pb^{+2}) = $ lead ion concentration; obtained via eq. (1) and measurement of pH, P, and E The ideal transient response is obtained via the following:

The $H_2$ flow into free space produced by an ideal generator of the test units configuration is:

$$(dw/dt) = (I \, K_2 K_3 D/K_1) = .42 \times 10^{-8} \, Lbs/second \quad (3)$$

where:
 $I = $ amps as measured $= 0.20$ at $0.1$ volts
 $K_1 = $ Faraday's law $= 10^5$ amp seconds/equivalent
 $K_2 = $ Moles of $H_2$/equivalent $= 0.5$
 $K_3 = $ Ft$^3$/Mole at standard conditions $-0.791$
 $D = H_2$ density at standard conditions $0.0053$ Lbs/Ft$^3$ The flow from equation (3) expressed as a pressure rise at constant volume is obtained by differentiating the equation of state:

$$(dp/dt) = (K_1/K_2)(RT/V)(dw/dt) \quad (4)$$

$$= 0.0164 \, psi/second \, 0.1 \, volt$$

$$or = 0.985 \, psi/minute/0.1 \, volt$$

where:
 $R = $ specific gas constant for $H_2 = 766$ Ft-Lbs/Lb $- °r$
 $T = $ gas temperature $= 520 \, °r$
 $V = $ available gas volume $= 20 \, cm^3$
 $K_1 = $ units conversion: 12 inches/foot
 $K_2 = $ units conversion: $1/16.4 \, in^3/cm^3$ It follows from equations (3) and (4) that the initial pressure rate for a given voltage will be inversely proportional to cell resistance. In addition to this, it can be shown that a cell's resistance is largely proportional to the inverse of its electrode area.

The actual response time of a device as described on the basis of 1 ft.$^2$ electrode surface area was 0.5 psi/sec/0.1 volt comparing favorably with the estimated time. The observed degradation is possibly due to loss of reaction site area by non-uniform deposition of catalyst and possibly anode flooding. The response time can be improved if extreme sensitivity is required for a specific application by assuring uniform catalyst deposition and wet-proofing the electrode. However, the response time of the aforesaid unit is adequate for most applications.

Figure 2:
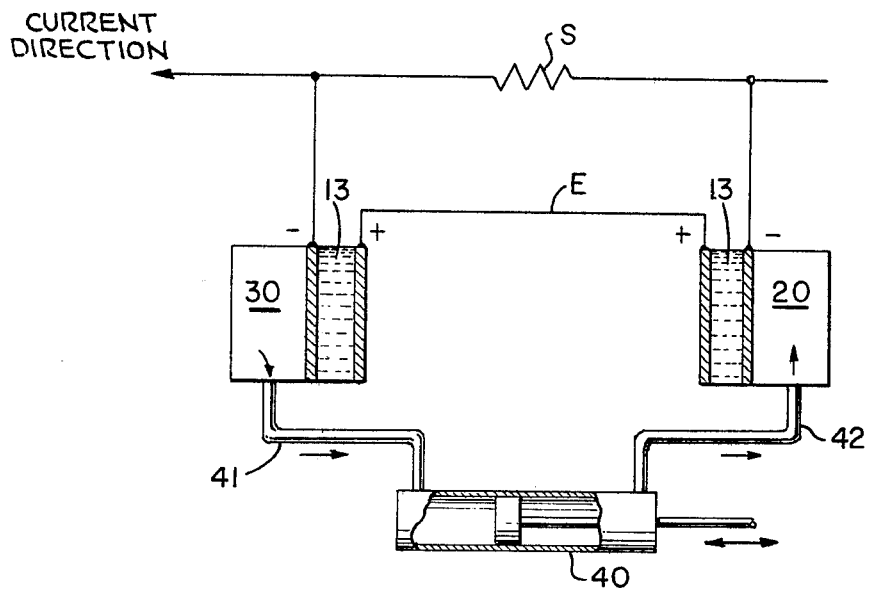
FIG. 2 is a cross-sectional, diagrammatic view of a control device employing two cells in tandem.

Although the device has been described with reference to a single cell, as indicated hereinbefore, the device preferably will utilize two cells as shown in FIG. 2 where the anodes of the separate cell are electrically connected, through E. When current flows to a higher value through the shunt 5, cell 20 will electrically discharge and, hence, experience a pressure depletion, while cell 30 will charge and offer a pressure rise. The net pressure change is now felt as a pressure differential across the force transducer 40 which is a double acting piston whose gas connections are 41 and 42 to cells 30 and 20, respectively. This device will give zero voltage when the device is not in use, preventing electrolysis and obviating the need of opening the shunt circuit. Additionally, the response is more rapid due to greater electrode surface areas and the creation of a pressure differential across the force transmitter 40.

Figure 3:
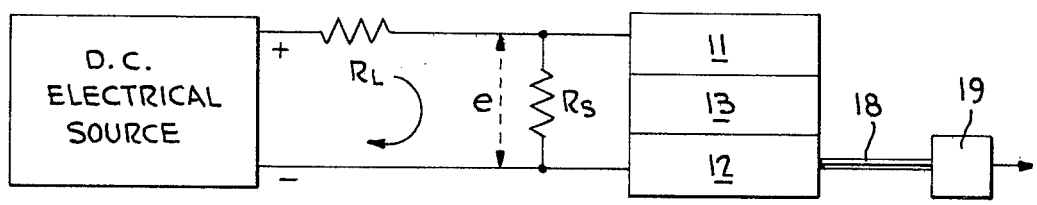
FIG. 3 is a diagrammatic view illustrating the application of the control device.

FIG. 3 illustrates the device tied into a DC electrical source. In the drawing a resistor, $R_L$ is the load on the electrical source and $R_S$ is a shunt resistor sized in order that $$R_S = (<0.050 \text{ volts/Max } I)$$

where $I$ equals the load current and $e$ equals $IR$ voltage across $R_S$. The pressure change is transmitted through tube 18 (corresponding to cavity 15 of FIG. 1) to a volume changing force transmitter 19, i.e., a bellows or diaphragm, etc.

Figure 4:
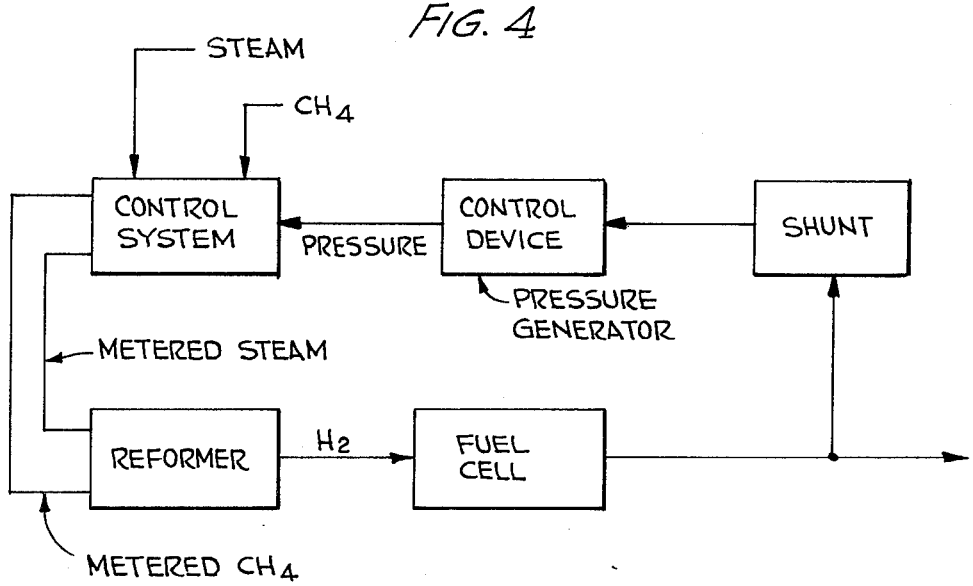
FIG. 4 is a block diagram of the control device integrated into a fuel cell power plant.

FIG. 4 is a flow diagram illustrating how the actual device is tied into a fuel cell system. As seen, the electrical current is passed to the control device through a shunt and imposed upon the electrodes of the cell. The electrochemical cell reacts in accordance with the current characteristics imposed across the electrodes of the cell. The cell reaction in turn causes the pressure change due to varying current characteristics from the set-point to actuate a control system which will vary the flow of reactants, for example, steam and methane, to a reformer for reformation. The hydrogen produced in the reformer is fed to the fuel cell for consumption. Accordingly, the control device adjusts the ultimate output of the fuel cell. As will be apparent, the control device can also be employed to control the flow of liquid coolants or the like in a coolant loop to regulate the temperature of the fuel cell stack; or for various other applications where similar characteristics are required, such as gas turbine electrical generators, high power circuit breakers, etc. It is only necessary that the system being controlled have a relatively high current, i.e., about 10 amps and above. Alternatively, the device can be used in reverse as a very sensitive force transducer.

Although the invention has been described with reference to an electrochemical cell utilizing an activated carbon disc electrode, lightweight electrodes comprising a metal support screen embedded in a catalytic mixture of metal and hydrophobic plastic binder and electrodes including porous metal sinters can be selected. Additionally, the cathode can be in various forms including porous sinters and the like. A porous cathode can be advantageous in that it provides greater reactive surface area.

In the drawing, the electrochemical cell is illustrated utilizing a free-flowing liquid electrolyte. However, the electrolyte can be impregnated or retained in a hydrophilic separator such as separators made of asbestos, ceramic, or polymeric materials. These modifications being within the ability of one skilled in the art are to be covered herein with the invention only being limited in accordance with the appended claims.

It is claimed:

1. A power system comprising in combination an electrical power source and an electrochemical control device said device comprising a consumable metal anode comprising lead, a gas cathode comprising a non-consumable electrode electrochemically reactive to hydrogen, an electrolyte mixture of lead perchlorate and perchloric acid in contact with and separating said anode and cathode, and a gas cavity having hydrogen gas therein and having a predetermined and controlled volume in fluid communication with said anode, means for setting said device at a predetermined gas pressure in said cavity corresponding to a predetermined potential imposed on said device, said combination being constructed and arranged whereby the IR from said power source is imposed upon said anode and cathode of said electrochemical control device through a shunt, said device being constructed and arranged to undergo a pressure change in said gas cavity as a function of IR change imposed upon said anode and cathode by said source to actuate a pressure force transmitter.

2. The power system of claim 1 wherein in said control device the cathode is a lightweight electrolyte comprising a conductive metal screen embedded in a catalytic mixture of metal and hydrophobic polymer.

3. The power system of claim 1 wherein in said control device the cathode is an activated carbon disc.

* * * * *